United States Patent
Wang et al.

(10) Patent No.: US 10,519,043 B2
(45) Date of Patent: Dec. 31, 2019

(54) CONTROL SYSTEM FOR DECREASING PRESSURE OF SUPERCRITICAL WATER SYSTEM AND METHOD THEREOF

(71) Applicants: XI'AN JIAOTONG UNIVERSITY, Xi'an, Shaanxi (CN); XI'AN WONFU ENERGY AND ENVIRONMENT TECHNOLOGIES CO., LTD., Xi'an, Shaanxi (CN)

(72) Inventors: Shuzhong Wang, Shaanxi (CN); Jie Zhang, Shaanxi (CN); Laisheng Wang, Shaanxi (CN); Xingying Tang, Shaanxi (CN); Yanhui Li, Shaanxi (CN); Jianqiao Yang, Shaanxi (CN)

(73) Assignees: XI'AN JIAOTONG UNIVERSITY, Xi'an, Shaanxi (CN); XI'AN WONFU ENERGY AND ENVIRONMENT TECHNOLOGIES CO., LTD., Xi'an, Shaanxi (CN)

( * ) Notice: Subject to any disclaimer, the term of this patent is extended or adjusted under 35 U.S.C. 154(b) by 211 days.

(21) Appl. No.: 15/611,752

(22) Filed: Jun. 1, 2017

(65) Prior Publication Data
US 2017/0269615 A1    Sep. 21, 2017

(51) Int. Cl.
*B67D 1/00*      (2006.01)
*C02F 1/00*      (2006.01)

(52) U.S. Cl.
CPC ........ *C02F 1/008* (2013.01); *C02F 2201/005* (2013.01); *C02F 2209/03* (2013.01)

(58) Field of Classification Search
CPC .......... C02F 1/008; C02F 1/72; C02F 11/086; C02F 2201/005; B01J 3/008
See application file for complete search history.

(56) References Cited

U.S. PATENT DOCUMENTS

| | | | | |
|---|---|---|---|---|
| 4,272,383 A * | 6/1981 | McGrew | ................. | B01J 3/042 166/302 |
| 5,252,224 A * | 10/1993 | Modell | ................ | B01D 29/117 210/695 |
| 5,362,519 A * | 11/1994 | Argyropoulos | ......... | B01F 3/088 427/385.5 |
| 6,238,568 B1 * | 5/2001 | Hazlebeck | ............... | A62D 3/20 210/697 |
| 2002/0121481 A1 * | 9/2002 | Peterson | .................. | B01J 20/20 210/673 |
| 2015/0299015 A1 * | 10/2015 | Wang | .................... | C02F 11/086 210/761 |

* cited by examiner

*Primary Examiner* — Reinaldo Sanchez-Medina

(57) ABSTRACT

A control system for decreasing pressure of a supercritical water system and a method therefor is provided, mainly including: a resistance water storage tank, a resistance pump, a capillary negative booster, a back pressure valve, a regulating valve and related stop valves. By switching the back pressure valve branch and the capillary negative booster branch, the pressure regulation is achieved while starting the system, closing down and in normal operation. The present invention is capable of achieving precisely controlling pressure of the system on the basis of effectively preventing problems exists in the solid particle materials pressure decreasing process such as abrasion and clogging of the internal elements of the valve. In addition, the back pressure valve branch is capable of reducing the operation complexity in the starting and shutdown process of the system, and the operation reliability is improved.

5 Claims, 1 Drawing Sheet

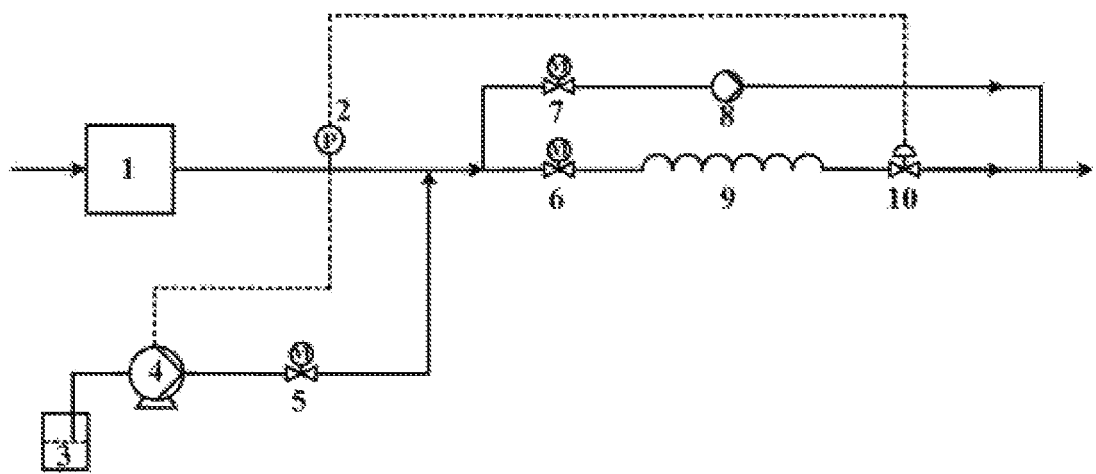

CONTROL SYSTEM FOR DECREASING PRESSURE OF SUPERCRITICAL WATER SYSTEM AND METHOD THEREOF

CROSS REFERENCE OF RELATED APPLICATION

The present application claims priority under 35 U.S.C. 119(a-d) to CN 201610136837.8, filed Mar. 10, 2016.

BACKGROUND OF THE PRESENT INVENTION

Field of Invention

The present invention relates to the technical field of environmental and chemical industry, and more particularly to a system for decreasing pressure of a supercritical water system and a method therefor.

Description of Related Arts

Supercritical water treatment technique means taking advantage of the special characteristics of supercritical water to treat organic waste and utilize resources in a high efficiency. Compared with the conventional organic waste treatment techniques, the supercritical water treatment technique has significant advantages. The supercritical water treatment technique mainly comprises supercritical water oxidation technique, supercritical water gasification technique and supercritical water hydrothermal synthesis technique. The supercritical water oxidation technique mainly aims to achieve complete oxidation of organic waste; the main object of supercritical water gasification technique aims to make organic waste gasification to produce hydrogen-rich combustible gas; and the supercritical water hydrothermal synthesis technique mainly aims to synthesize high purity nano-particles. The supercritical water oxidation technique means taking advantage of the special characteristics of the supercritical water includes low viscosity, low dielectric constant, high diffusivity and other special characteristics, so that the organic matter and oxidants completely dissolved in the supercritical water perform a rapid and thorough homogeneous reaction, wherein organic carbon in the organic matter is converted into carbon dioxide; chlorine, sulfur, phosphorus and other elements are converted into corresponding inorganic salts, the vast majority of nitrogen is converted into nitrogen, so as to achieve efficient and harmless treatment of organic waste.

The supercritical water treatment technique means taking advantages of the special characteristics of the supercritical water to achieve innocent treatment and resource utilization of organic waste, which has apparent advantages compared with the conventional organic matter treatment technique. The supercritical water treatment technique mainly comprises supercritical water oxidation technique, supercritical water gasification technique and supercritical hydrothermal synthesis technique. The supercritical water oxidation technique mainly aims at complete oxidation of organic waste degradation. The supercritical water gasification technique aims at making the organic waste generate hydrogen-rich combustible gas. The supercritical hydrothermal synthesis technique mainly aims at synthesizing high purity nano-particles. The supercritical water oxidation technique means that taking advantage of the characteristics of the supercritical water such as low viscosity, low dielectric constant and high diffusivity, in such a manner that the organic matter which is completely dissolved in the organic matter performs a rapid and thorough homogeneous reaction, and the organic carbon is converted into carbon dioxide; chlorine, sulfur, phosphorus and other elements are converted into corresponding inorganic salt, wherein the vast majority of nitrogen is converted into nitrogen, so as to achieve efficient and harmless treatment of the organic waste.

The supercritical water treatment technique is defined as the most promising waste water treatment technique in one of the six major areas listed by the US National Key Technology: Energy and Environment. Supercritical water gasification technology means that taking advantage of the special physical and chemical characteristics of the supercritical water and under the premise of without adding or adding in a small amount of oxidants, under the homogeneous condition of the supercritical water, the organic matter performs hydrolysis, pyrolysis and other reactions to generate flammable gaseous products mainly based on hydrogen. Adding a small amount of oxidants in the vaporization process of the supercritical water aims to further improve the gasification rate of the organic waste. Supercritical hydrothermal synthesis technique means that in a high pressure reactor, the supercritical water serves as reactive medium, in such a manner that metal ions perform hydrolysis and dehydration reaction in the hydrothermal medium to nucleate and grow and finally form nano-metal oxide particles with a certain size and crystal habit. By filtering and recycling nano-metal oxide to achieve resource utilization of metal ions, so as to obtain significant economic benefits.

In all of the supercritical water technique, before entering the reactor, the materials containing water need to be pressurized above the critical point of water, and cannot be discharged out of the system after the reaction is finished. This involves decreasing the temperature and pressure of materials. After the reaction is completed, cooling the materials can be achieved by a heat exchanger. The completion of the materials requires a throttle part, which meanwhile is capable of ensuring requirements of a steady pressure of the system and regulating the pressure of the system. The conventional supercritical water system adopt a pressure regulating valve to control pressure of the system and decrease the pressure, so the pressure drop of the whole system is achieved on one point, which leads to a high material flow rate here, and also easily leads to a valve failure to affect the operation reliability of the system.

In addition, during the pressure decreasing process of the supercritical water system containing solid particles, the existence of inert inorganic salt leads to severe abrasion or clogging the internal elements of the regulating valve, so it is not advisable to achieve a complete pressure decrease in a single step. Capillary buck is achieved by the flow of fluid through the small diameter capillary generated by the resistance along the way to achieve material pressure drop, and by adjusting the fluid flow into the capillary to achieve precise control of capillary pressure. It can be seen that the fluid flow in the capillary pressure decreasing means by the on-way resistance generated by flowing through a small diameter capillary by the fluid to achieve a material pressure drop, which is capable of achieving precisely controlling front pressure of the capillary by regulating the flow of the fluid entering the capillary.

It can be seen that the compared with single-valve step-down, fluid flow distance in the capillary is long and the pressure loss rate is gentle, which is capable of effectively avoiding the wear of the high-speed main fluid to the throttle element. In addition, regulating the flow rate into the capillary fluid is capable of achieving a precise control of the system pressure, so as to ensure stable and reliable operations of the system.

The capillary pressure decreasing mode has a significant advantage over the single valve step-down, but besides decreasing the pressure, it is necessary to achieve precise control of the system pressure, which requires proper connections and control operation method among the capillary buck, the valve, the pump and other equipments. At present, the control method for decreasing pressure the capillary in the supercritical water treatment system has not been reported.

SUMMARY OF THE PRESENT INVENTION

Accordingly, an object of the present invention is to solve the problems mentioned above and provide a control system for decreasing pressure of a supercritical water system, and a method therefore.

In order to achieve the object mentioned above, the present invention adopts technical solutions as follows:

A control system for decreasing pressure of a supercritical water system, comprises: a capillary branch, a water resistance branch and a back pressure valve branch which is connected in parallel with the capillary branch; wherein a fluid outlet of a supercritical water reactor is connected with the capillary branch, an outlet of the is a fluid outlet; an outlet of the water resistance branch is connected with a pipe in front of an inlet of the capillary branch.

Further improvement of the present invention is as follows.

The water resistance branch comprises a resistance water storage tank, an outlet of the resistance water storage tank is connected with a resistance pump and a first stop valve in sequence; wherein an outlet of the first stop valve is connected with an inlet of the capillary branch.

The capillary branch comprises: a second stop valve, a blood capillary negative booster and a regulating valve which are connected in series; an inlet of the second stop valve is connected with an outlet of the supercritical water reactor; and an outlet of the regulating valve is a fluid outlet.

The back pressure valve branch comprises: a third stop valve and a back pressure valve; an inlet of the third stop valve is connected with a tube in front of the inlet of the second stop valve; an outlet of the back pressure valve is connected with a tube on a rear end of the regulating valve.

A pressure gauge for monitoring fluid pressure of the outlet of the supercritical water reactor is provided on the outlet of the supercritical water reactor.

The present invention further discloses a control method for decreasing pressure of a supercritical water system, comprising steps of:

1) an initial state: turning off the first stop valve, the second stop valve and the third stop valve; stopping the resistance pump; and turning on the back pressure valve and the regulating valve;

2) starting the system comprising when the control system needs to boost, turning on the third stop valve on the back pressure valve; regulating opening degree of the back pressure valve, regulating the opening degree from large to small, so that a rear pressure of the reactor gradually increases to a pressure I, operating steadily for 30 min; switching the back valve branch and the capillary branch; switching on the second stop valve, switching off the third stop valve, switching on the first stop valve and switching on the resistance pump; gradually increasing output flow of the resistance pump since 30% of the charge is outputted by the resistance pump, so as to make the, so as to gradually increase back pressure of the reactor until value of the back pressure is II, so as to achieve increasing pressure of the system;

3) normal operation a: if the back pressure of the reactor decreases, regulating the resistance pump, increasing flow of resistance water until the back pressure of the reactor returns to normal; if the back pressure of the reactor decreases sharply, regulating the resistance pump to increase flow of resistance water; if full load operation of the resistance water pump is not capable of making the back pressure of the reactor increase to an expected value, decreasing open degree of the regulating valve, so as to restore pressure of the system to normal;

b: if the back pressure of the reactor increases, regulating the resistance pump, decreasing flow of resistance water until the back pressure of the reactor returns to normal; if the back pressure of the reactor increases sharply, regulating the resistance pump to decrease flow of resistance water; if load of the resistance water pump decreases to 30%, which is still not capable of making the back pressure of the reactor increase to an expected value, turning of the resistance water pump, at the moment if the back pressure of the reactor is smaller than a normal value, decreasing open degree of the regulating valve, so as to restore pressure of the system to normal;

4) shutting down the system: when temperature of the system is reduced and pressure needs decreasing, fully opening the regulating valve, gradually decreasing water flow of the resistance water pump, when the load is reduced to 30%, releasing interlock among the back pressure of the reactor, the regulating valve and the resistance water pump, turning off the resistance water pump, turning off the first stop valve; switching from a capillary pressure decreasing branch to a back pressure valve branch, turning on the third stop valve, turning off the second stop valve, establishing interlock between pressure if the outlet of the reactor and the back pressure valve, gradually decreasing opening degree of the back pressure valve, in such a manner that the back pressure of the reactor gradually decreases to normal pressure.

Compared with the conventional art, the present invention has beneficial effects as follows.

The device of the present invention mainly comprises a resistance water storage tank, a resistance pump, a capillary negative booster, a back pressure valve, a regulating valve and related stop valves. By switching the back pressure valve branch and the capillary negative booster branch, the pressure regulation is achieved while starting the system, closing down and in normal operation. The present invention is capable of achieving precisely controlling pressure of the system on the basis of effectively preventing problems exists in the solid particle materials pressure decreasing process such as abrasion and clogging of the internal elements of the valve. In addition, the back pressure valve branch is capable of reducing the operation complexity in the starting and shutdown process of the system, and the operation reliability is improved.

These and other objectives, features, and advantages of the present invention will become apparent from the following detailed description, the accompanying drawings, and the appended claims.

BRIEF DESCRIPTION OF THE DRAWINGS

The FIGURE is a perspective view of according to a preferred embodiment of the present invention.

1—super-critical water reactor; 2—pressure gauge; 3—resistance water storage tank; 4—resistance pump; 5—first stop valve; 6—second stop valve; 7—third stop valve; 8—back pressure valve; 9—capillary negative booster; 10—regulating valve.

DETAILED DESCRIPTION OF THE PREFERRED EMBODIMENT

Further description of the present invention is illustrated combining with the accompanying drawings.

Referring to the FIGURE, a pressure decreasing system of the present invention comprises a capillary branch and a back pressure valve branch; wherein a second stop valve 6 of the capillary branch is connected with an inlet of the capillary negative booster 9, an outlet of the capillary negative booster 9 is connected with a regulating valve 10; a third stop valve 7 in the back pressure valve is connected with an inlet of the back pressure valve 8. A pressure gauge 2 monitors fluid pressure at an outlet of a supercritical water reactor, the outlet of the supercritical water reactor is connected with a pressure decreasing unit. An water inlet of a resistance pump 4 is connected with a resistance water storage tank 3, an outlet of the resistance pump 4 is connected with the first stop valve 5, wherein the first stop valve 5 is mixed with main liquid at an inlet if the pressure decreasing unit.

The present invention further discloses a control method for the supercritical water system, comprising steps of:

an initial state:

turning off the first stop valve 5, the second stop valve 6 and the third stop valve 7; stopping the resistance pump 4; and turning on the back pressure valve 8 and the regulating valve 10;

system starting stage: comprising:

1) when the control system needs to boost, turning on the third stop valve 7 on the back pressure valve; regulating opening degree of the back pressure valve (8), regulating the opening degree from large to small, so that a rear pressure of the reactor gradually increases to a pressure I, operating steadily for 30 min;

2) switching the back valve branch and the capillary branch; switching on the second stop valve 6, switching off the third stop valve 7, switching on the first stop valve 5 and switching on the resistance pump 4; gradually increasing output flow of the resistance pump 4 since 30% of the charge is outputted by the resistance pump 4, so as to make the, so as to gradually increase back pressure of the reactor until value of the back pressure is II, operating steadily for 30 min, so as to achieve increasing pressure of the system;

system in normal operation stage 1) if the back pressure of the reactor decreases, regulating the resistance pump 4, increasing flow of resistance water until the back pressure of the reactor returns to normal; if the back pressure of the reactor decreases sharply, regulating the resistance pump 4 to increase flow of resistance water; if full load operation of the resistance water pump 4 is not capable of making the back pressure of the reactor increase to an expected value, decreasing open degree of the regulating valve 10, so as to restore pressure of the system to normal;

2) if the back pressure of the reactor increases, regulating the resistance pump 4, decreasing flow of resistance water until the back pressure of the reactor returns to normal; if the back pressure of the reactor increases sharply, regulating the resistance pump 4 to decrease flow of resistance water; if load of the resistance water pump 4 decreases to 30%, which is still not capable of making the back pressure of the reactor increase to an expected value, turning of the resistance water pump 4, at the moment if the back pressure of the reactor is smaller than a normal value, decreasing open degree of the regulating valve 10, so as to restore pressure of the system to normal.

system in shutting down stage:

1) when temperature of the system is reduced and pressure needs decreasing, fully opening the regulating valve 10, gradually decreasing water flow of the resistance water pump 4, when the load is reduced to 30%, releasing interlock among the back pressure of the reactor, the regulating valve 10 and the resistance water pump 4, turning off the resistance water pump 4, turning off the first stop valve 5;

2) switching from a capillary pressure decreasing branch to a back pressure valve branch, turning on the third stop valve 7, turning off the second stop valve 6, establishing interlock between pressure if the outlet of the reactor and the back pressure valve 8, gradually decreasing opening degree of the back pressure valve, in such a manner that the back pressure of the reactor gradually decreases to normal pressure.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A control system for decreasing pressure of a supercritical water system, comprising: a capillary branch, a water resistance branch and a back pressure valve branch, wherein the back pressure valve is connected in parallel with the capillary branch; wherein a fluid outlet of a supercritical water reactor (1) is connected with the capillary branch, an outlet of the capillary branch is a fluid outlet; an outlet of the water resistance branch is connected with a pipe in front of an inlet of the capillary branch;

wherein the water resistance branch comprises a resistance water storage tank (3), an outlet of the resistance water storage tank (3) is connected with a resistance pump (4) and a first stop valve (5) in sequence; wherein an outlet of the first stop valve (5) is connected with the inlet of the capillary branch;

wherein the capillary branch comprises: a second stop valve (6), a capillary negative booster (9) and a regulating valve (10), wherein the second stop valve (6), the capillary negative booster (9) and the regulating valve (10) are connected in series; an inlet of the second stop valve (6) is connected with the fluid outlet of the supercritical water reactor (1); and an outlet of the regulating valve (10) is a fluid outlet.

2. The control system for decreasing pressure of the supercritical water system, as recited in claim 1, wherein the back pressure valve branch comprises: a third stop valve (7) and a back pressure valve (8); an inlet of the third stop valve (7) is connected with a tube in front of the inlet of the second stop valve (6).

3. The control system for decreasing pressure of the supercritical water system, as recited in claim 1, wherein a pressure gauge (2) for monitoring fluid pressure of the outlet of the supercritical water reactor is provided on the outlet of the supercritical water reactor (2).

4. The control system for decreasing pressure of the supercritical water system, as recited in claim 2, wherein a pressure gauge (2) for monitoring fluid pressure of the outlet of the supercritical water reactor is provided on the outlet of the supercritical water reactor (2).

5. A method for decreasing pressure of a supercritical water system adopting the control system as recited in claim 2, comprising steps of:

1) an initial state: turning off the first stop valve (5), the second stop valve (6) and the third stop valve (7); stopping the resistance pump (4); and turning on the back pressure valve (8) and the regulating valve (10);

2) starting the system comprising when the control system needs to boost, turning on the third stop valve (7) on the back pressure valve; regulating opening degree of the back pressure valve (8), regulating the opening degree from large to small, so that a rear pressure of the reactor gradually increases to a pressure I, operating steadily for 30 min; switching the back valve branch and the capillary branch; switching on the second stop valve (6), switching off the third stop valve (7), switching on the first stop valve (5) and switching on the resistance pump (4); gradually increasing output flow of the resistance pump (4) since 30% of the charge is outputted by the resistance pump (4), so as to make the, so as to gradually increase back pressure of the reactor until value of the back pressure is II, so as to achieve increasing pressure of the system;

3) normal operation a: if the back pressure of the reactor decreases, regulating the resistance pump (4), increasing flow of resistance water until the back pressure of the reactor returns to normal; if the back pressure of the reactor decreases sharply, regulating the resistance pump (4) to increase flow of resistance water; if full load operation of the resistance water pump (4) is not capable of making the back pressure of the reactor increase to an expected value, decreasing open degree of the regulating valve (10), so as to restore pressure of the system to normal;

b: if the back pressure of the reactor increases, regulating the resistance pump (4), decreasing flow of resistance water until the back pressure of the reactor returns to normal; if the back pressure of the reactor increases sharply, regulating the resistance pump (4) to decrease flow of resistance water; if load of the resistance water pump (4) decreases to 30%, which is still not capable of making the back pressure of the reactor increase to an expected value, turning of the resistance water pump (4), at the moment if the back pressure of the reactor is smaller than a normal value, decreasing open degree of the regulating valve (10), so as to restore pressure of the system to normal;

4) shutting down the system: when temperature of the system is reduced and pressure needs decreasing, fully opening the regulating valve (10), gradually decreasing water flow of the resistance water pump (4), when the load is reduced to 30%, releasing interlock among the back pressure of the reactor, the regulating valve (10) and the resistance water pump (4), turning off the resistance water pump (4), turning off the first stop valve (5); switching from a capillary pressure decreasing branch to a back pressure valve branch, turning on the third stop valve (7), turning off the second stop valve (6), establishing interlock between pressure if the outlet of the reactor and the back pressure valve (8), gradually decreasing opening degree of the back pressure valve, in such a manner that the back pressure of the reactor gradually decreases to normal pressure.

* * * * *